2 Sheets—Sheet 1.
F. F. KANNE.
HARVESTER REEL.
No. 10,266. Reissued Jan. 2, 1883.
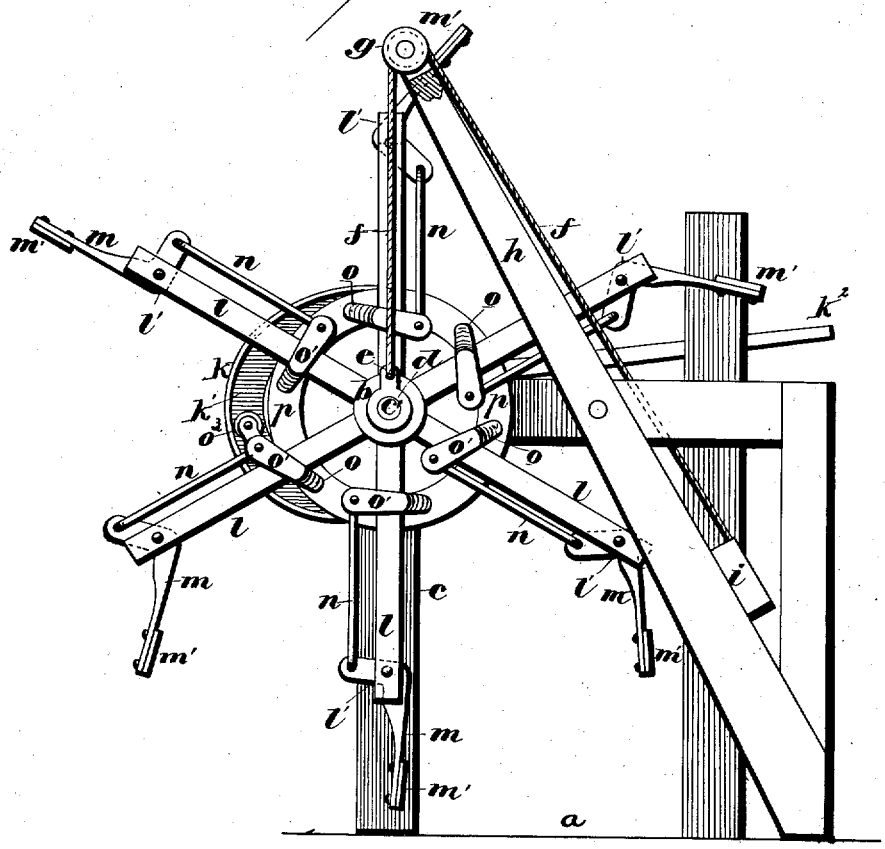
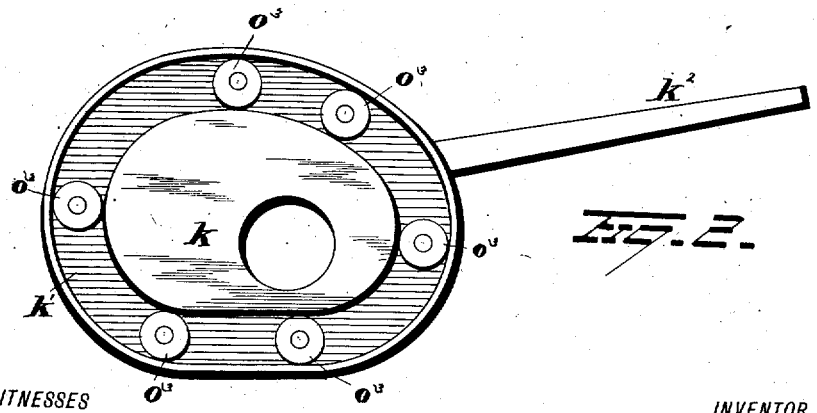
Fig. 2.
WITNESSES
S. G. Nottingham
George Cook.
INVENTOR
F. F. Kanne.
By F. A. Seymour
Attorney 2 Sheets—Sheet 2.
F. F. KANNE.
HARVESTER REEL.
No. 10,266. Reissued Jan. 2, 1883.
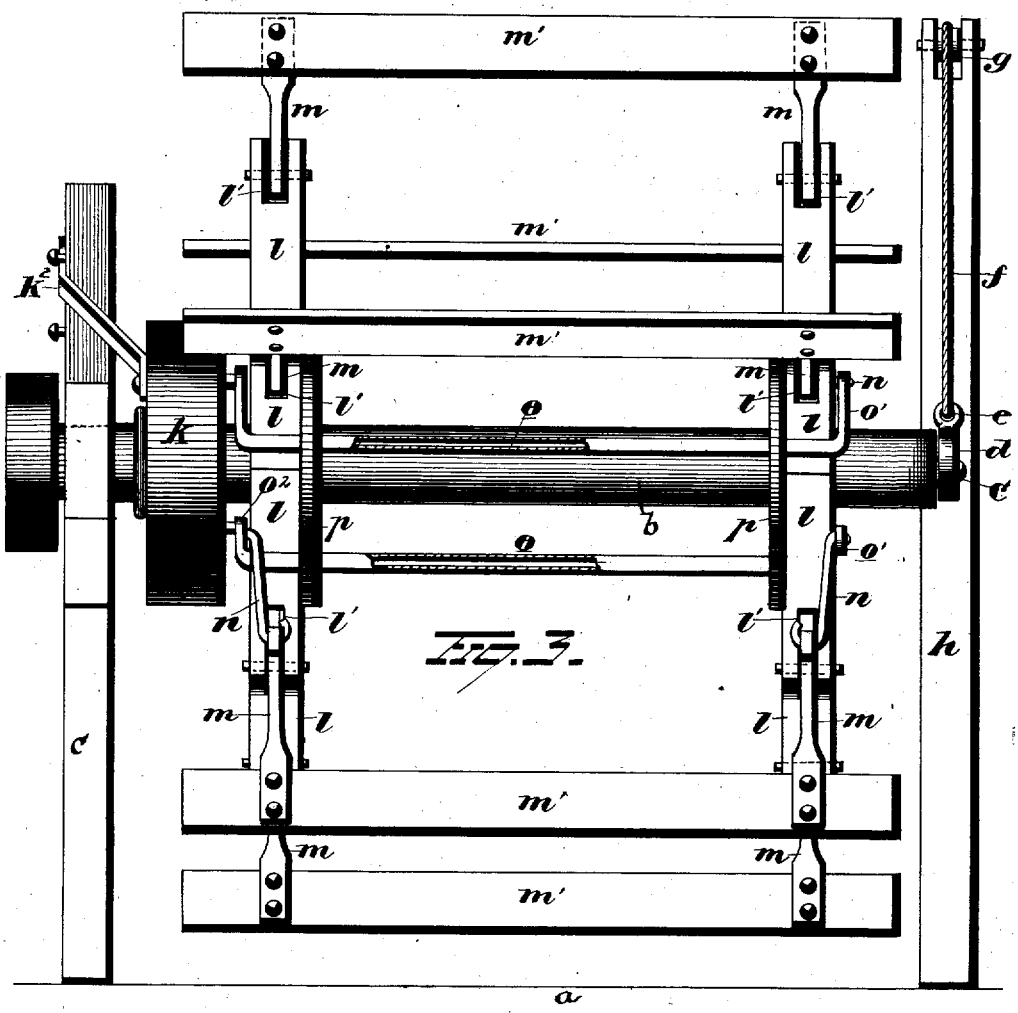
WITNESSES
S. G. Nottingham
George Cook.
INVENTOR
F. F. Kanne.
B. F. Ashmore.
Attorney

UNITED STATES PATENT OFFICE.

FREDERICK F. KANNE, OF WATERVILLE, MINNESOTA.

HARVESTER-REEL.

SPECIFICATION forming part of Reissued Letters Patent No. 10,266, dated January 2, 1883.

Original No. 255,298, dated March 21, 1882. Application for reissue filed October 28, 1882.

*To all whom it may concern:*

Be it known that I, FREDERICK F. KANNE, of Waterville, in the county of Le Sueur and State of Minnesota, have invented a new and useful Improvement in Jointed Harvester-Reels; and I do hereby declare that the following is a full, clear, and exact description of the same, reference being had to the accompanying drawings, forming part of this specification, in which—

Figure 1 is an end elevation of my improved jointed harvester-reel. Fig. 2 is a face view of the cam and its operating-lever, and Fig. 3 is a front elevation.

My invention relates to improvements in jointed reels for harvesters; and it consists in the peculiar construction and arrangement of the parts, as hereinafter more fully set forth.

In the accompanying drawings, *a* represents the platform of a harvester, which is provided at its front edge with fingers and cutters (not shown) of any of the well-known constructions.

*b* represents the horizontal shaft of a reel, adapted to revolve above the platform and in front of the cutters in the usual manner. The horizontal shaft *b* of the reel is journaled in the vertical reel-post *c*, secured at its lower end to the platform *a*, near its front edge, and near the driver's side thereof. The shaft *b* of the reel is unsupported by a post on the grain side of the harvester, but is provided with a central gudgeon, *c'*, on its grain end, to which a metallic hook or box, *d*, is secured, the upper end of the hook being provided with an eye, *e*, to which a cord, *f*, is attached, the cord *f* thence extending over a pulley, *g*, in the upper end of an inclined brace, *h*, attached to the platform *a*, and provided with a weight, *i*, at its rear end, whereby the end of the reel-shaft on the grain side of the harvester is supported, and the weight or strain on the box and reel-shaft on the driver's side of the machine is counterbalanced.

*k* represents a cam supported loosely on the reel-shaft on the driver's side of the machine, and provided with a cam-groove, *k'*. The cam *k* is provided with a hole arranged eccentrically for the passage of the reel-shaft *b*, and is also provided with a lever, $k^2$, secured to its closed face on the driver's side of the machine, whereby the driver in his seat, and while the machine is in motion, can, by raising or lowering the lever $k^2$, give more or less pitch to the cam and through intermediate devices adjust the joints of the reel. Any of the ordinary devices for holding the lever $k^2$ when adjusted may be employed.

*l* represents the reel-arms, mortised into the reel-shaft *b* at their inner ends in the usual manner, and each provided at its outer end with a slot, *l'*, in which slots are pivoted by pins the bell-crank levers *m m*, the outer ends of each pair of bell-crank levers *m* having secured to them a slat or beater, *m'*, of the reel, and the inner end of each bell-crank lever being connected by a hook, *n*, to the crank-arm $o'$ or $o^2$ of a rock-shaft, *o*. The crank-arms $o^2$ on the driver's side of the machine are provided with rollers $o^3$, adapted to revolve in the cam-groove *k'* of the cam *k*. The rock-shafts *o* are made of tubular iron, thereby securing great lightness and increasing the strength over the same amount of metal when in a solid form.

*p p* represent flat rings secured to the inner faces of the reel-arms *l* to strengthen the reel-arms. The rings *p* are also provided with holes for the passage and support of the tubular rock-shafts *o*.

By this construction, in the revolution of the reel in the usual manner, the slats or beaters will seize the uncut grain and lift it upon the canvas or platform, raising lodged grain. In windy days, when the grain leans from the platform, the reel will reach over the heads of the grain and move it back to the cutter-bar.

Another advantage of the construction of my jointed reel is that it will not force the grain over the platform, because the beaters are tipped, and are lifted out of the cut grain on the platform slowly and gradually.

Having fully described my invention, what I claim as new, and desire to secure by Reissue Letters Patent, is—

1. The combination, with reel-arms, bell-cranks pivoted to the outer ends of the reel-arms, and beaters secured to the outer ends of the bell-cranks, of an adjustable cam or eccentric, rock-shafts mounted in the reel, and constructed to engage with and to be actuated by the cam or eccentric, and hooks connecting the bell-cranks on opposite ends of the beaters with arms on opposite ends of the rock-shafts, substantially as set forth.

2. In combination with the reel-shaft, journaled in suitable bearings, and provided with reel-arms and flat rings or disks, a cam loosely hung on the said shaft, bell-crank levers pivotally secured to the outer ends of the reel-arms, beaters rigidly secured to the bell-cranks, rock-shafts journaled in the flat rings or disks, and hooks connecting the said rock-shafts and bell-cranks, all of the parts adapted to operate as described.

3. In combination with an overhanging reel-shaft provided with reel-arms, and flat rings or disks *p*, a cam or eccentric loosely hung on the said shaft, a lever for adjusting the inclination or pitch of the said cam or eccentric, bell-crank levers pivotally secured to the outer ends of the reel-arms, beaters rigidly secured to the bell-cranks, rock-shafts journaled in the flat rings or disks, and having cranked ends, one of which latter engages with the cam or eccentric, and hooks connecting the said rock-shafts and bell-cranks, all of the parts adapted to operate as described.

4. In combination with the overhanging reel-shaft and upright standard, an inclined brace provided at its upper end with a pulley, and a rope passing over said pulley, and provided at one end with a weight and at the opposite end with a metallic bearing for said shaft.

5. The combination of the reel-shaft, reel-arms, rings, or disks *p*, the cam provided with a cam-groove, a lever for adjusting the cam, the rock-shafts, the bell-crank levers pivotally secured to the outer ends of the reel-arms, the beaters secured to the bell-cranks, and the hooks connecting the rock-shafts and bell-cranks.

6. In combination with an overhanging reel-shaft, journaled as described, the reel-arms, flat rings or disks *p*, a cam provided on its inner face with a cam-groove, a lever for adjusting said cam, the rock-shafts having crank-arms, rollers secured to the said crank-arms on the cam side of the machine and adapted to move in the cam-groove, bell-cranks pivotally secured to the outer ends of the reel-arms, beaters rigidly secured to the bell-cranks, and hooks connecting the said rock-shafts and bell-cranks.

FREDERICK FRANK KANNE.

Witnesses:
M. R. EVERETT,
ELIAS P. CASE.